(12) United States Patent
Grotenhuis

(10) Patent No.: US 10,010,169 B2
(45) Date of Patent: Jul. 3, 2018

(54) COMPUTER WORK DESK

(75) Inventor: Eric Arthur Grotenhuis, Folsom, CA (US)

(73) Assignee: Eric Arthur Grotenhuis, Folsom, CA (US)

( * ) Notice: Subject to any disclaimer, the term of this patent is extended or adjusted under 35 U.S.C. 154(b) by 653 days.

(21) Appl. No.: 13/065,953

(22) Filed: Apr. 2, 2011

(65) Prior Publication Data

US 2012/0248263 A1    Oct. 4, 2012

(51) Int. Cl.
- *A47B 9/00* (2006.01)
- *A47B 21/02* (2006.01)
- *F16M 11/10* (2006.01)
- *F16M 11/24* (2006.01)

(52) U.S. Cl.
CPC ............ *A47B 21/02* (2013.01); *F16M 11/10* (2013.01); *F16M 11/24* (2013.01); *F16M 2200/048* (2013.01); *F16M 2200/08* (2013.01)

(58) Field of Classification Search
CPC .. A47B 23/04; A47B 9/10; A47B 9/12; F16M 11/04; F16M 11/18
USPC .... 248/161, 407, 159, 157, 162.1, 917–923, 248/126, 454, 274.1, 123.11, 295.11; 108/43, 147, 107, 49, 34, 35, 38
See application file for complete search history.

(56) References Cited

U.S. PATENT DOCUMENTS

| | | |
|---|---|---|
| 578,325 A | 3/1897 | Fleming |
| 767,717 A | 8/1904 | Shellhammer |
| 1,193,417 A | 8/1916 | Pauls |
| 1,925,087 A | 9/1933 | Andren |
| 2,098,655 A | 11/1937 | De Lisle |
| 2,122,969 A | 7/1938 | Whitcomb |
| 2,256,372 A | 9/1941 | Chabon |
| 2,601,998 A | 7/1952 | Murray |
| 2,605,156 A | 7/1952 | Laxo |
| 2,646,322 A | 7/1953 | Laxo |
| 2,710,780 A | 6/1955 | Lawes |
| 2,781,608 A | 2/1957 | Cutrow |
| 2,825,612 A | 3/1958 | Watson |
| 2,844,908 A | 7/1958 | Moore |
| 2,982,050 A | 5/1961 | May |
| 3,078,613 A | 2/1963 | Morcheles |
| 3,200,774 A | 8/1965 | Suter |

(Continued)

OTHER PUBLICATIONS

Author: Jakob Leitner, et al. Title: "Flux—A Tilting Multi-Touch and Pen Based Surface" Publisher: Canadian Information Processing Society Toronto, Ont., Canada, Canada; Date: 2009; No. of pp. 6; Published in: CHI EA '09 Extended Abstracts on Human Factors in Computing Systems; pp. 3211-3216.

(Continued)

*Primary Examiner* — Nkeisha Smith
(74) *Attorney, Agent, or Firm* — David Lewis; Jay White

(57) ABSTRACT

A monitor mounting device that allows more flexibility and support for large-format, thin, flat, touchscreen monitors. This mount offers the solution to use these monitors as the computer interface, along with a standard keyboard and mouse platform mounted below for more traditional input options. The flexible height and tilt controls combined with the constantly-level keyboard tray provide an improved, comfortable balance between large-format, touch computing and traditional work station configurations. This invention is optimized to improve human comfort and the computing experience.

14 Claims, 9 Drawing Sheets

(56) References Cited

U.S. PATENT DOCUMENTS

| | | | |
|---|---|---|---|
| 3,232,248 A | 2/1966 | Gelb | |
| 3,273,517 A | 9/1966 | Amthor, Jr. et al. | |
| 3,364,881 A | 1/1968 | Kool | |
| 3,370,556 A | 2/1968 | Kooi | |
| 3,586,409 A | 6/1971 | Cisler | |
| 3,741,514 A | 6/1973 | Snurr | |
| 3,826,204 A | 7/1974 | Kuhlmann et al. | |
| 3,874,309 A | 4/1975 | Cowley | |
| 4,154,173 A | 5/1979 | Chesnut | |
| 4,188,007 A | 2/1980 | Ubezio | |
| 4,196,674 A | 4/1980 | Van Laarhoven | |
| 4,351,245 A | 9/1982 | Laporte | |
| 4,508,305 A | 4/1985 | Johnson et al. | |
| 4,635,893 A | 1/1987 | Nelson | |
| 4,638,969 A | 1/1987 | Brown | |
| 4,639,049 A | 1/1987 | Frascaroli et al. | |
| 4,735,466 A | 4/1988 | Wolters et al. | |
| 4,779,922 A * | 10/1988 | Cooper | 297/188.21 |
| 4,880,270 A * | 11/1989 | Cooper | 297/188.21 |
| 4,890,561 A | 1/1990 | Hampshire et al. | |
| 4,981,085 A | 1/1991 | Watt | |
| 5,041,770 A * | 8/1991 | Seiler et al. | 318/265 |
| 5,056,864 A | 10/1991 | Cooper | |
| 5,058,965 A | 10/1991 | Thorn | |
| 5,174,223 A | 12/1992 | Nagy et al. | |
| 5,211,367 A | 5/1993 | Musculus | |
| 5,287,815 A | 2/1994 | Gross | |
| 5,294,087 A | 3/1994 | Drabczyk et al. | |
| 5,357,873 A | 10/1994 | Hilton | |
| 5,398,622 A | 3/1995 | Lubinskas et al. | |
| 5,408,940 A | 4/1995 | Winchell | |
| 5,437,235 A | 8/1995 | Randolph | |
| 5,443,017 A | 8/1995 | Wacker et al. | |
| 5,450,800 A | 9/1995 | Leonard | |
| 5,461,974 A | 10/1995 | Reneau | |
| 5,480,224 A | 1/1996 | Ugalde | |
| 5,671,091 A | 9/1997 | Monroe et al. | |
| 5,680,820 A | 10/1997 | Randolph | |
| 5,735,222 A | 4/1998 | Webb | |
| 5,738,316 A | 4/1998 | Sweere et al. | |
| 5,769,369 A | 6/1998 | Meinel | |
| 5,845,586 A | 12/1998 | Moore | |
| 5,857,415 A | 1/1999 | Richard | |
| 5,909,934 A | 6/1999 | McGraw | |
| 5,915,659 A | 6/1999 | Scannell, Jr. | |
| 5,947,429 A | 9/1999 | Sweere et al. | |
| 6,038,986 A | 3/2000 | Ransil | |
| 6,075,502 A | 6/2000 | McDowall et al. | |
| 6,098,935 A | 8/2000 | Kaplan et al. | |
| 6,119,605 A | 9/2000 | Agee | |
| 6,135,032 A | 10/2000 | Ko | |
| 6,208,505 B1 | 3/2001 | Kuchta et al. | |
| 6,269,753 B1 | 8/2001 | Roddan | |
| 6,270,157 B1 | 8/2001 | Kapushinski | |
| 6,286,440 B1 | 9/2001 | Jyringi | |
| 6,286,794 B1 | 9/2001 | Harbin | |
| 6,296,408 B1 * | 10/2001 | Larkin et al. | 400/682 |
| 6,298,794 B1 * | 10/2001 | Brown et al. | 108/50.01 |
| 6,374,752 B1 | 4/2002 | Walser | |
| 6,394,402 B2 | 5/2002 | Coonan et al. | |
| 6,439,657 B1 | 8/2002 | Tholkes | |
| 6,484,648 B1 | 11/2002 | Long | |
| 6,533,479 B2 | 3/2003 | Kochanski | |
| 6,536,357 B1 * | 3/2003 | Hiestand | 108/95 |
| 6,712,008 B1 * | 3/2004 | Habenicht et al. | 108/96 |
| 6,736,469 B2 | 5/2004 | Long | |
| 6,736,559 B2 * | 5/2004 | Larkin et al. | 400/472 |
| 6,874,431 B1 | 4/2005 | Danna | |
| 7,061,753 B2 * | 6/2006 | Michoux et al. | 361/679.05 |
| 7,100,516 B2 | 9/2006 | Riddiford et al. | |
| 7,100,517 B1 | 9/2006 | Godwin | |
| 7,134,719 B2 | 11/2006 | Moglin et al. | |
| 7,165,715 B2 | 1/2007 | Elgie et al. | |
| 7,204,193 B2 * | 4/2007 | Scherrer et al. | 108/43 |
| 7,322,653 B2 | 1/2008 | Dragusin | |
| 7,518,508 B2 * | 4/2009 | Cvek | 340/545.6 |
| 7,621,544 B2 * | 11/2009 | Rossini | 280/79.3 |
| 7,677,519 B2 | 3/2010 | Gauer | |
| 7,690,317 B2 * | 4/2010 | Beck et al. | 108/143 |
| 7,712,722 B2 * | 5/2010 | Lu et al. | 248/371 |
| 7,721,658 B2 | 5/2010 | Seeley et al. | |
| 7,997,211 B2 * | 8/2011 | Peterson et al. | 108/42 |
| 8,113,670 B2 * | 2/2012 | Muraki et al. | 353/122 |
| 8,191,487 B2 * | 6/2012 | Theesfeld et al. | 108/144.11 |
| 8,267,360 B2 * | 9/2012 | Su | 248/123.11 |
| 2001/0015567 A1 | 8/2001 | Tholkes et al. | |
| 2002/0041785 A1 * | 4/2002 | Larkin et al. | 400/489 |
| 2002/0043185 A1 | 4/2002 | Krieger et al. | |
| 2002/0053862 A1 | 5/2002 | Visser et al. | |
| 2002/0088910 A1 | 7/2002 | Sweere et al. | |
| 2002/0100395 A1 | 8/2002 | Long | |
| 2002/0112652 A1 | 8/2002 | Freking et al. | |
| 2002/0113531 A1 | 8/2002 | Ma | |
| 2002/0130228 A1 | 9/2002 | Liu | |
| 2002/0189505 A1 | 12/2002 | Markofer | |
| 2003/0010260 A1 | 1/2003 | Chang | |
| 2003/0213415 A1 | 11/2003 | Ross et al. | |
| 2003/0230222 A1 | 12/2003 | Liu | |
| 2004/0035989 A1 | 2/2004 | Sweere et al. | |
| 2004/0060485 A1 | 4/2004 | Chang | |
| 2004/0090153 A1 | 5/2004 | Touzani | |
| 2004/0100167 A1 | 5/2004 | Rudolf | |
| 2004/0173124 A1 | 9/2004 | Chang | |
| 2004/0173125 A1 | 9/2004 | Chang | |
| 2004/0194670 A1 | 10/2004 | Lai | |
| 2004/0237852 A1 | 12/2004 | Tsai | |
| 2004/0256524 A1 | 12/2004 | Beck et al. | |
| 2005/0040299 A1 * | 2/2005 | Twyford | 248/177.1 |
| 2005/0056194 A1 | 3/2005 | Danna | |
| 2005/0081761 A1 | 4/2005 | Chang | |
| 2005/0088816 A1 | 4/2005 | Zodnik et al. | |
| 2005/0145762 A1 | 7/2005 | Sweere et al. | |
| 2005/0236527 A1 * | 10/2005 | Takagi | 248/27.1 |
| 2005/0248239 A1 | 11/2005 | Newhouse et al. | |
| 2005/0288571 A1 | 12/2005 | Perkins et al. | |
| 2006/0065166 A1 | 3/2006 | Chi et al. | |
| 2006/0065167 A1 | 3/2006 | Chi et al. | |
| 2006/0071530 A1 | 4/2006 | Wang | |
| 2006/0096505 A1 | 5/2006 | Sykes | |
| 2006/0118010 A1 | 6/2006 | Bartoszewicz | |
| 2006/0185563 A1 | 8/2006 | Sweere et al. | |
| 2006/0187626 A1 | 8/2006 | Ditzik | |
| 2006/0238087 A1 | 10/2006 | Holt | |
| 2006/0283098 A1 | 12/2006 | Golino et al. | |
| 2007/0001413 A1 | 1/2007 | Rossini | |
| 2007/0126321 A1 | 6/2007 | Waugh et al. | |
| 2007/0227408 A1 | 10/2007 | Phillips | |
| 2007/0228680 A1 * | 10/2007 | Reppert et al. | 280/47.35 |
| 2007/0266913 A1 | 11/2007 | Hardt | |
| 2007/0295870 A1 | 12/2007 | Peterson et al. | |
| 2008/0033893 A1 | 2/2008 | Brown | |
| 2008/0072801 A1 | 3/2008 | Korber et al. | |
| 2009/0178596 A1 | 7/2009 | Skiba | |
| 2010/0066132 A1 | 3/2010 | Tal Marchand | |
| 2010/0193653 A1 | 8/2010 | Sweere et al. | |
| 2010/0294899 A1 | 11/2010 | Page | |
| 2010/0307382 A1 | 12/2010 | Mammana et al. | |
| 2010/0327136 A1 | 12/2010 | Papic et al. | |
| 2010/0328306 A1 | 12/2010 | Chau et al. | |
| 2011/0042911 A1 * | 2/2011 | Kozlowski et al. | 280/47.35 |

OTHER PUBLICATIONS

Author: Kenrick Kin, et al. Title: "Determining the Benefits of Direct-Touch, Bimanual, and Multifinger Input on a Multitouch Workstation" | No. of pp. 6; Publisher: ACM New York, NY, USA; Date: 2009; Published in: GI '09 Proceedings of Graphics Interface 2009; pp. 119-124: URL to Online Version: http://vis.berkeley.edu/papers/multitargetUserStudy/.

Author: Anthro Corporation Title:"Elevate Workstations" Date: Nov. 24, 2009; pp. 4; Publisher: anthro.com URL: http://web.archive.org/web/20090.

(56) References Cited

OTHER PUBLICATIONS

Author: Ideum Title:"MT-50 Multi Touch Table" Date: Feb. 10, 2010; pp. 2; Publisher: ideum.com URL: http://web.archive.org/web/20100.

Author: PQ Labs Title:"iTable" Date: Mar. 2, 2010; pp. 4; Publisher: multitouch.com URL: http://web.archive.org/web/20090316082424/http://www.multitouch.com/.

Author: Wikipedia.Org; Title:"Microsoft Surface" Date: Dec. 2, 2008; pp. 3; Publisher: wikipedia.org URL: http://web.archive.org/web/20081202063602/http://www.microsoft.com/surface/about_faqs/faqs.aspx.

Author: Wikipedia.Org; Title:"Microsoft Surface" Date: Dec. 18, 2008; pp. 6; Publisher: wikipedia.org URL: http://web.archive.org/web/20081218003003/http://en.wikipedia.org/wiki/Microsoft_Surface.

Author: Ergotron, Inc. Title:"Neo-Flex® Mobile MediaCenter (Product sheet)" Date: 2009; pp. 2; Publisher: ergotron.com URL: http://web.archive.org/web/*/http://www.ergotron.com/ Products/tabid/65/PRDID/425/language/en-AU/Default.aspx.

Author: Ergotron, Inc. Title:"WorkFit™ C-Mod (Product sheet)" Date: 2009; pp. 2; Publisher: ergotron.com URL: ttp://web.archive.org/web/20110124053352/http://www.ergo tron.com/Portals/0/literature/productSheets/english/05-087.pdf.

* cited by examiner

COMPUTER WORK DESK

RELATED APPLICATIONS

This application claims the benefit of prior file provisional application filed Eric Grotenhuis (Filed: Apr. 2, 2010).

FEDERALLY SPONSORED RESEARCH OR DEVELOPMENT

Not Applicable

FIELD

This specification is generally related to desks and computer integration into these desks.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Desks for computers are well known. However, desks for computer use may be uncomfortable to use. Consequently, a need exists for an ergonomically designed computer workstation to, not only, reduce physical problems computer workers encounter every day, but also improve our interactions to current computer technology. Many people have become fascinated by touch computing and want this more intuitive style of computing integrated into our computerized workplace. Large, touch-enabled monitors are now commercially available, but no desk or monitor mount fully accommodates the ergonomic needs of a human to properly interact with touch technology, on such a large scale.

The novelty of this computer work desk provides support for a large-format, thin, flat-screen monitor as the computer interface, and a standard keyboard and mouse platform mounted below for traditional options for input. The flexible height and tilt controls combined with the constantly-level keyboard tray provide an improved, comfortable balance between large-format, touch computing and traditional work station configurations. This invention is optimized to improve human comfort and the computing experience. It is designed around people, to fit people.

The earliest patents that related closest to ergonomic desk solution related to drafting tables and a wide variety of other technology related to four topics; 1) How to raise and lower the table top using a single column support with counterweights, brake systems, cables, pulleys, ball screws, springs, and motors. These are disclosed in U.S. Pat. Nos. Chesnut (U.S. Pat. No. 4,154,173), Laport (U.S. Pat. No. 4,351,245), Watt (U.S. Pat. No. 4,981,085), Nagy et al. (U.S. Pat. No. 5,174,223), Ransit (U.S. Pat. No. 6,038,986), Winchell (U.S. Pat. No. 5,408,940), Reneau (U.S. Pat. No. 5,461,974), Agee (U.S. Pat. No. 6,119,605), and Harbin (U.S. Pat. No. 6,286, 794). 2) How to control the tabletop tilt angle, mounted only upon a stationary shaft. These are disclosed in U.S. Pat. Nos. Cooper (U.S. Pat. No. 4,880,270), Leonard (U.S. Pat. No. 5,450,800), Monroe et al. (U.S. Pat. No. 5,671,091) and Coonan et al. (U.S. Pat. No. 6,394,402). 3) How to integrate and mount computer monitors to surfaces using shafts, brackets, and counterweights. These are disclosed in U.S. Pat. Nos. Wolters (U.S. Pat. No. 4,735,466), Ugalde (U.S. Pat. No. 5,480,224), Godwin (U.S. Pat. No. 7,100,517), and Dragusin (U.S. Pat. No. 7,322,653). 4) How keyboard trays mounted to desks using gears, springs, arms, and levers. These are disclosed in U.S. Pat. Nos. Hampshire et al. (U.S. Pat. No. 4,890,561), Wacker (U.S. Pat. No. 5,287,815), Lubinskas et al. (U.S. Pat. No. 5,398,622), Randolf (U.S. Pat. No. 5,437,235), Webb (U.S. Pat. No. 5,735,222), Moore (U.S. Pat. No. 5,845,586), and Kochanski (U.S. Pat. No. 6,533,479). The novelty of this invention is the elegant balance in combinations of prior art concepts, both improving and simplifying a combination of technologies into an updated solution, closer to the goal of improving the human condition.

Various attempts at display terminals, keyboards and workstations have tried to prevent repetitive stress injuries and reduce discomfort related to sitting at a computer. Most prior art ignores the advances of current computing technology, and neglects the need for a user to quickly adjust the monitor support in a more complete way that allows a more immersive and flexible computing environment. Some prior art, U.S. Patents Dragusin (U.S. Pat. No. 7,322,653), Moglin et al (U.S. Pat. No. 7,134,719), Danna (U.S. Pat. No. 6,874,431), Tholkes (U.S. Pat. No. 6,439,657), Larkin et al (U.S. Pat. No. 6,296,408), Kapushinski (U.S. Pat. No. 6,270, 157), and Cooper (U.S. Pat. No. 5,056,864), (U.S. Pat. No. 4,880,270), restrict user positions, relegating them to a stationary chair mounted to a desk configuration. Prior art, U.S. patents Seeley et al (U.S. Pat. No. 7,721,658), Beck et al (U.S. Pat. No. 7,690,317), Long (U.S. Pat. No. 6,484, 648), Ko (U.S. Pat. No. 6,135,032), Agee (U.S. Pat. No. 6,119,605), and Wacker et al (U.S. Pat. No. 5,443,017) place design focus on single or multiple, horizontal computing surfaces that allow height adjust without much tilt adjustment. Few designs combine full tilt and height adjustment for such heavy devices.

Other representatives of the prior art attempts are the designs disclosed in U.S. Pat. Nos. E. Laxo (U.S. Pat. No. 2,605,156), F. G. R. Lawes (U.S. Pat. No. 2,710,780), J. Gelb (U.S. Pat. No. 3,232,248), F. R. Amthor et al (U.S. Pat. No. 3,273,517), Kooi (U.S. Pat. No. 3,364,881), Brown (U.S. Pat. No. 4,638,969), Randolph (U.S. Pat. No. 5,680, 820), Richard (U.S. Pat. No. 5,857,415), and Walser (U.S. Pat. No. 6,374,752). These prior art designs appear to be steps in the right direction, but are outdated and fail to provide the intuitive technology to adequately address current computing technology needs and allow users to adjust their computing platform to optimum positions, quickly and easily.

Other mentions of similar concepts in ergonomic desks combining with touch computing solutions don't really address the combination of technologies in a successful balance. Most of the projects come from research projects based around usability and functions of touch computing on large-scale monitors. Most of these address one part of the technology solution. The novelty of this invention maximizes both to the benefit of the user.

Some of these articles are:

Leitner, Jakob. "FLUX—A Tilting Multi-Touch and Pen Based Surface." Media Interaction Lab, Upper Austria University of Applied Sciences, Hagenberg, Austria, Apr. 4, 2009.

Kin, Kenrick; Agrawala, Maneesh; DeRose, Tony. "Determining the Benefits of Direct-Touch, Bimanual, and Multifinger Input on a Multitouch Workstation." University of California, Berkeley, 2010.

Other previous product inspirations include: Anthro—Elevate line of creative workstations; Ideum—MT-50 Multi-touch Table; Microsoft—Surface table; iTable—PQLabs, Ergotron—Neo-Flex® Mobile MediaCenter VHD, WorkFit C-Mod Sit-Stand Workstation {patent applications held #20020088910, 0040035989, 005014576, 20060185563}

And still more inspirations come previous patent applications that are relevant to prior art include: Brown (2008/0033893), and Hardt (2007/0266913) for innovations related to raising and lowering the top, Papic et al. (2010/0327136) as related to the use of braking levers and compression calipers to allow for adjustable tilt controls, and Holt (2006/0238087) for matters related to the concept of combining computer technology with that of desks.

BRIEF SUMMARY

It is an object of this invention to integrate a large touch monitor into the top of an adjustable desk that allows the user a wide range of simple height and tilt adjustments. The novelty of this invention combines previous technologies in drafting and ergonomic computer tables, with the improvements to accommodate large, touch monitors as an interactive work surfaces. Counterweights, rails, pulleys, and cables are balanced to assist with height and tilt adjustment features.

Engaging a set of conveniently-positioned brake levers, the user can release friction brakes along a column and adjust the monitor to a comfortable height. Engaging another set of similar levers along side the height adjust levers, the user can disengage the tilt brake mechanism and adjust the monitor to a full vertical or horizontal angle, or any angle in-between. By grabbing the sides of the computer monitor and engaging the levers, the user can now quickly and easily adjust the work surface into the optimum sitting or standing position. In another embodiment, a reversible motor, gear, and ball screw mechanism assists with height adjustment.

Another object of this invention to include a unique, adjustable keyboard tray mounted to the monitor. The keyboard tray uses opposing miter gears and shafts to maintain a horizontal position, regardless of the angle of the monitor mount. The self-leveling, adjustable keyboard and mousing tray is mounted below the desktop to offer an optional platform for a more traditional desktop interface experience. To adjust the depth of the tray, one simply pushes two buttons along side the tray, unlocks the position, and slides it back and forth to the right depth, then releases the buttons to lock the tray into position.

This invention does not include any specific computers or monitor technologies, as the choices are left to the discretion of the user. In another embodiments, an integrated rack, mounted to the support arm, provides a storage area to hold any computer they choose. This invention only pertains to the adjustable desk, consisting of the support shaft, the related adjustment assistance mechanisms, the integrated keyboard tray, the tilting monitor mount attached to the top of said desk, and the related accessories to said utility desk.

BRIEF DESCRIPTION OF DRAWINGS

In the following drawings like reference numbers are used to refer to like elements. Although the following figures depict various examples of the invention, the invention is not limited to the examples depicted in the figures.

DETAILED DESCRIPTION

Figure 1:
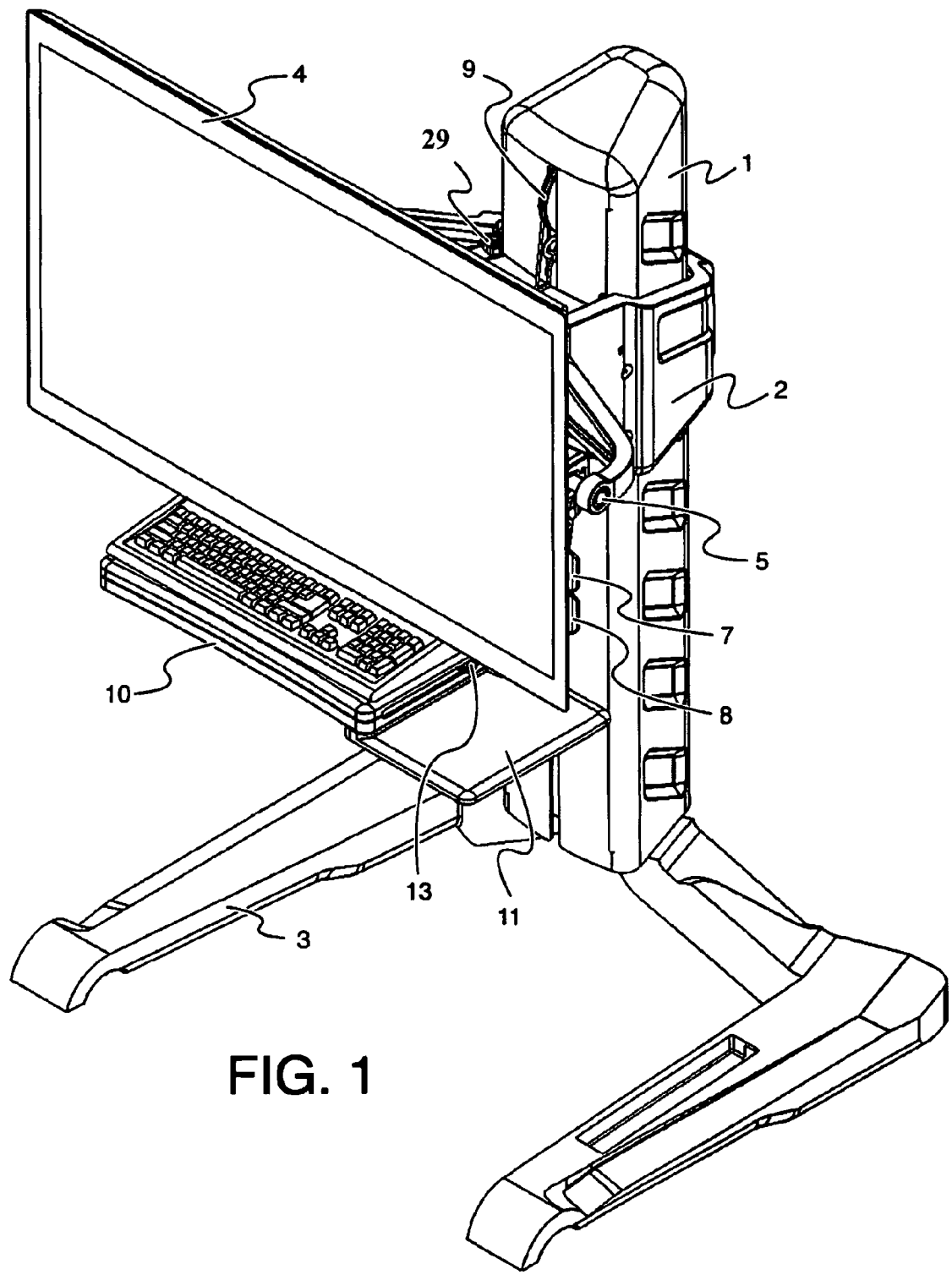
FIG. 1 is a front angled view of an embodiment of the desk with vertical top.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Since the invention of the typewriter, we have physically interacted with technology for document making in the same or a similar manner. For many tasks, the traditional drafting table, a knife, and a pen have been replaced with cramped office desks stacked with monitors and mice. Conventional, boxy desks do not naturally fit the organic form of human beings. Recent advancements in touch technology and flat panel monitors require an updated design to support this new technology and improve the ergonomic experience for the user. This new desk technology offers this improved, hybrid computing experience through a combination fully adjustable desk and a touch computer monitor mount. A comparison would be taking the adjustable concepts of an adjustable chair and applying them to a desk.

The monitor may be any size. In an embodiment, an oversized 37" (measured diagonally) or smaller, Light Emitting Diode (LED) High Definition (HD) monitor with multi-touch capabilities is integrated into the top of the desk. In another embodiment the monitor may be 60" or another size (measured diagonally) or smaller. The desk is designed so that any computer can provide the computing power and operating software that runs the work station. Having any computer plug into the integrated monitor and desk top allows for the operator to customize the platform and level of performance needed for their specific workflow by connecting any computer to the work desk.

Underneath the front of the desk is an integrated, self-leveling keyboard tray. The keyboard tray has internal track and spring-loaded, button lock mechanism on both sides that allow for sliding backward and forward adjustments. If one would like to sit and work in a more traditional manner, the desk may be configured to improve traditional work positions and make them more comfortable. Simple mechanical levers independently release control brakes and allow the user to quickly adjust the height and the tilt of the desktop to provide maximum comfort and adaptability.

Never effectively addressed with other desks, this computerized desk may help people stand up or sit more comfortably as they work behind today's standard computer workstations. The top of the desk may be adjusted down to a horizontally flat 24" desk height, or tilted vertically and raised to a 48" height. Other embodiments may require higher or lower adjustments to this range. The desk quickly adapts to people of all shapes and sizes.

The desk has an open body design, which means that the legs are in the back and the front is open so as not to interfere with the user's movement or desired position while working. In other words, by not having any front legs and by having the integrated keyboard, the user is given a free range of movement underneath the desk. Consequently, the open body allows maximum, unimpeded access to the touch screen monitor. The vertical position allows for full-featured media viewing. The desk top may also be adjusted so that the desk top is oriented at a 90° angle of tilt. Counterweights and mechanical spring-loaded adjustments, modeled after old drafting tables, allow for easy transitions from sitting to standing positions within 4 seconds. In another embodiment, an electrical motor and ball screw will mount to the top unit and assist moving the monitor up and down along the center stack.

In an embodiment there are several modules that may be attached to the desk. For example, a rack may be attached to the desk for holding a personal computer. Similarly, an integrated taboret or small cabinet, a height adjustable laptop tray, a side table, a full length cabinet, and/or a lighting fixture may be attached to the desk. As a result of the modular design, different modules may be removed and/or attached, so that the desk fits into a variety of workplace environment. Lighting and shelving may be provided in combination with the desk. In an embodiment, the desk has three input devices options: standard mouse, standard keyboard, and multiple-finger touch screen. In other embodiments there may be fewer input options and/or other input options instead of and/or in addition to the three input options listed.

The adjustable keyboard tray is large enough for a mousing area for either left or right handed users. In an embodiment, the desk has integrated speakers that support a rich multi-media experience. In an embodiment, a power source with six plugs may be integrated in the body. Other embodiments may include a swiveling option, a wall-mount option, a variety of monitor sizes, a fully 180° tilt mechanism, a ceiling mount option, providing comfort and computing ease to many people, in any position. And yet one more embodiment will allow for adjustments to the center of gravity of the monitor so that the monitor is more balanced and the need for a monitor counterweight will be unnecessary. Modifications to the support shaft and mounting structure to the monitor support plate will also need modification to fit the needs of this described embodiment.

FIG. 1 is a front angled view of an embodiment of the desk with a vertical top. This desk is made from 3 basic large parts. The 1 central post provides support for the 2 support arm which is all supported with the 3 legs that have two extended feet that extend past the center of gravity of the desk to keep the desk from falling forward. The central post is extruded metal with 3 sets of rails mounted on the inside and 3 sets of rails on the outside. In another embodiment, the rails may disappear and be replaced with tracks to keep the support armature supported and running smooth. Regardless of those details, any embodiment of the center stack must be strong enough to support both lateral and vertical pressures of more that 200 lbs. The 2 support arm is the most complicated portion of the invention. It contains all the controls to adjust the work desk as it slides up and down on the 1 central post, with the aid of 22 wheels or pulleys. The 4 monitor mounts to a steel 15 support plate which is mounted to a 5 steel shaft with a barrel-drilled aluminum 16 support block. This 15 support plate is then mounted to said 16 block and rotates on internal needle bearings. The 5 shaft is then mounted to the 2 support armature. The 5 rod cannot spin inside the arm so a pin is driven through the rod to stabilize it within the 2 armature. The 5 shaft is also long enough to extend out to both sides of the 2 support arm and mount in such a way to prevent any rotation of the 5 shaft, either with pins or interlocking shapes. The plate also supports a 14 bracket that the control levers bolt into. There is 7 an upper lever and 8 a lower lever. The 7 upper levers are for tilt adjustment and the 8 lower lever disengages the brakes 29 to allow easy height adjustment along the 1 post. There are matching levers pivotally attached to the support structure, placed in such a way that a person only needs to grab the side of the 4 monitor, engage the levers that release braking mechanisms and the desktop will easily float into position, or pivoted to another angle to use as a working surface (e.g., for drawings upon), if desired. The height of the unit can raise and lower through use of a 9 pulley and counterweight system. The 10 keyboard tray and 11 mousing tray mounts to support blocks that then mount underneath the monitor mount with gears and shafts. The 13 buttons alongside the keyboard tray allow for easy back and forth adjustment of the keyboard tray.

Figure 2:
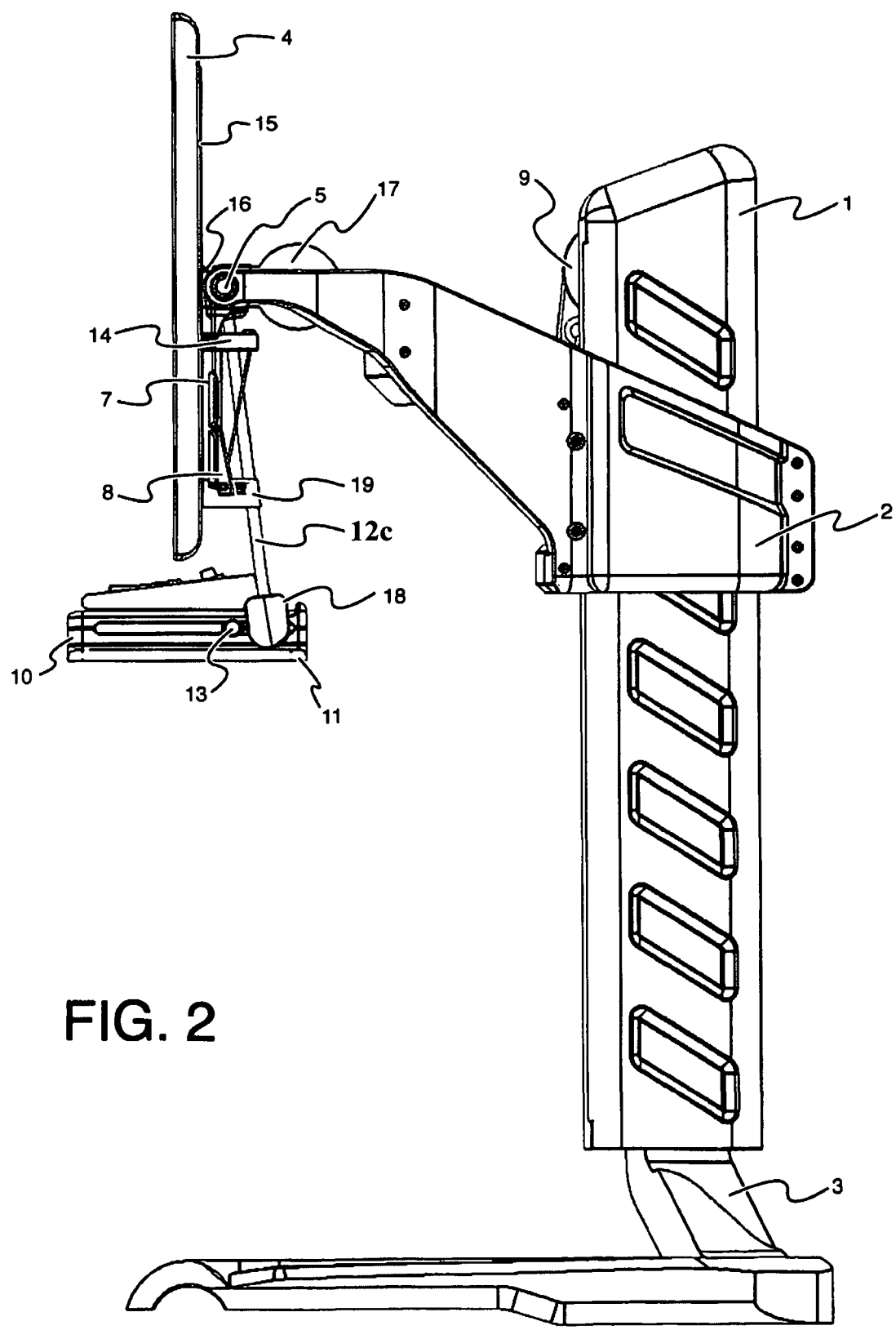
FIG. 2 is a side view of an embodiment of the desk with vertical top.

FIG. 2 is a comprehensive side view of an embodiment of the desk with the monitor in a full vertical tilt position. This view shows better detail to the 12c vertical keyboard shafts that mounts to the bottom of the 15 monitor support plate, and support each side of the 10 keyboard tray and adjustment levers. Using the extended 19 lightweight plastic support blocks, the vertical keyboard shafts 12a and 12c are set back and do not mount perfectly parallel to the monitor mount to allow for the tray and the user to move closer to the monitor during use. The levers are first mounted to 33 axles that are supported by lightweight plastic 14 support blocks, then mounted to the back of the steel 15 support plate. The 4 monitor will attach to the support plate, which mounts to the 16 metal monitor support block, which is then balanced with the 17 cylindrical counterweight to help aid in the tilt adjustment for the monitor. The 10 keyboard tray mounts to a shaft with a 39 small button, 38 arm, and 42 miter gears at each end. They engage with 43 miter gears mounted to the end of the vertical tray shafts 12a and 12c, that are geared to another set of 45 miter gears mounted to the 5 main support shaft. 18 Gear housings support all four sets of gears meshing properly to keep the 10 keyboard tray level, regardless of 4 monitor tilt angle. The lower portion of 44 keyboard tray shaft 12c travels through the 19 lightweight plastic support blocks, also mounted to the 15 support plate.

Figure 3:
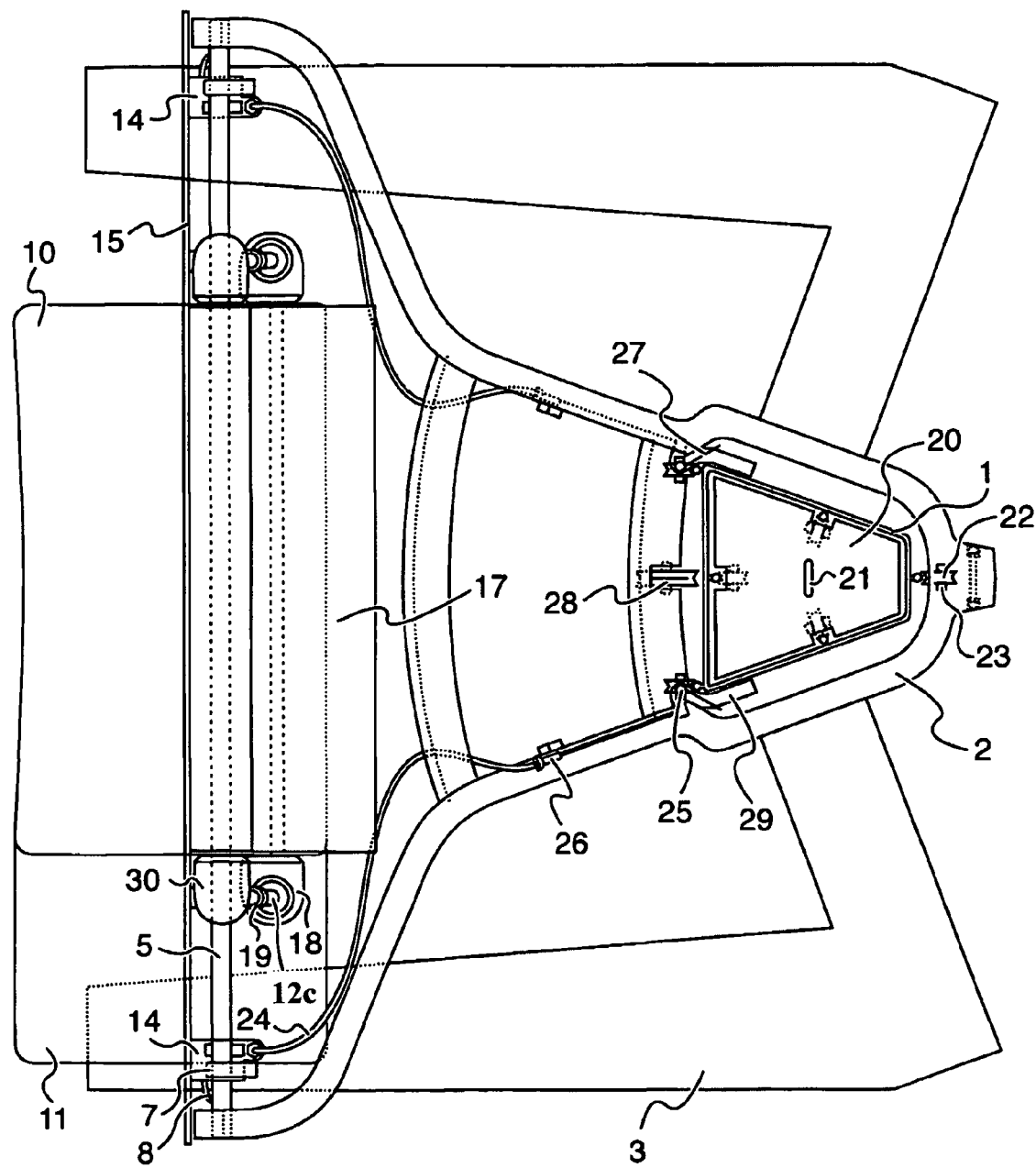
FIG. 3 is a top view of an embodiment of the desk with vertical top.

FIG. 3 is a top view of an embodiment of the desk with the top in a vertical position. This view highlights the 1 center post and the counterweight system within. The 1 center post is formed from extruded aluminum and contains 6 different rails for 22 wheels to travel. The 22 wheels and rails are all the same size. There are 3 outside the 1 column and 3 rails within the 1 column. The inside rails are for the 20 counterweight to use to track properly and ride smooth, inside the 1 post. The 20 counterweight is made of a dense metal and contains 6 different 22 wheels and axles, that engage with the rails on the interior of the 1 post. There is an 21 eyelet screwed into the 20 counterweight that attaches to a 37 cable that travels over a system of 28 pulleys and attaches to the 2 support armature. All 22 wheels spin on sealed bearings mounted to 23 solid axles bolted to the 2 armature or mounted to adjustment blocks that are mounted to the 2 support armature.

This illustration also highlights the 16 metal monitor support block, 17 counterweight, shaft assembly, needed to support the tilt mechanism for the 4 monitor. Next to the 12c support block is the top keyboard tray 45 gearing. Another set of 30 upper gear housings are needed to support this gear alignment and mesh to the 44 miter gear mounted to the 5 main shaft assembly.

The height adjustment brake system is also highlighted in this drawing. The lower set of 8 levers alongside the monitor, release the 29 brakes that hold it on to the 1 central post. The braking technology uses a 24 cable pulled through a housing and 26 ferule to move the 29 calipers away from the 1 center post. The 29 calipers rotate on a 25 stationery posts and use 27 springs to create the braking energy through the 31 brake pads, to the 1 central post, locking the 2 support armature to the 1 central post. This illustration shows the position of the counterweight to the 2 support armature.

There are also 4 grooved 22 wheels in the front and 2 in the back mounted to the 2 support armature in a place to best line up to the rails on the extruded 1 post. This system provides tracking support laterally as well as vertical support for the 2 support armature.

Figure 4:
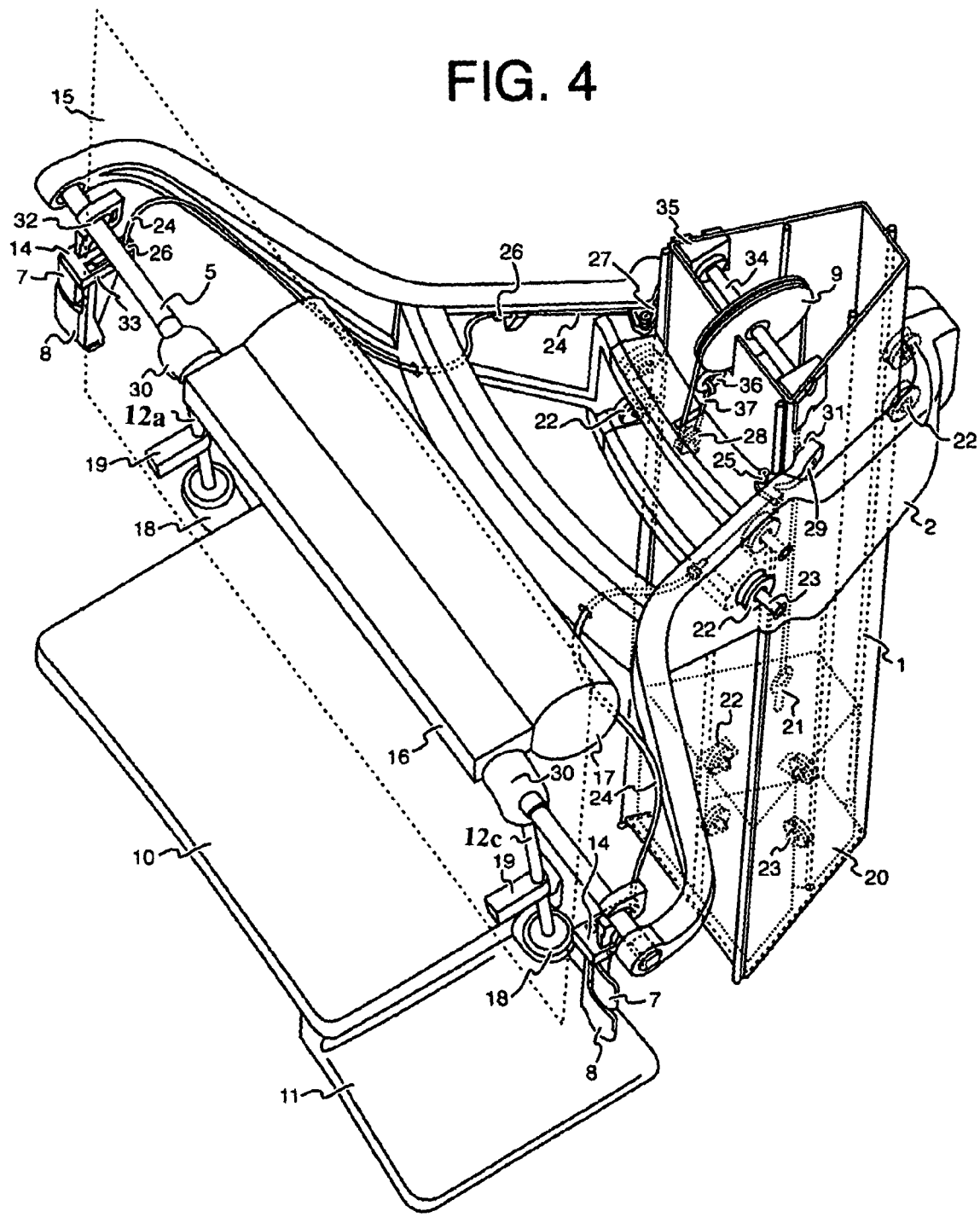
FIG. 4 is a detailed isometric view of the interior mechanics of an embodiment of the desk with the monitor and legs removed.

FIG. 4 is a detailed isometric view of the interior mechanics of an embodiment of the desk with the monitor and legs removed. This detailed drawing shows all the mechanical parts of the; counterweight height and tilt, assisted adjustment system; the self-leveling keyboard tray mechanism; and the braking control mechanisms. The 4 monitor and 3 legs are not included in this drawing. The difference with this detailed view is in descriptions for the 7 tilt brake lever and the associated 32 tilt brake pad that is designed to; fit into a corresponding slot inside the 7 lever so as to provide support to the 32 pad to grab onto the 5 main shaft and provide the lock function to the 5 main shaft. Both the 7 tilt lever and the 8 height brake release levers are mounted to the 14 support block with a single 33 solid metal axle that goes through the 14 block and the levers. This fulcrum mounts to a 14 support block that bolts on to the 15 monitor plate giving it stability. Each lever has a 46 paddle spring that goes around the 33 lever axles and attach to the levers and provide more braking power, and give the levers smooth action.

This drawing also includes the description of parts involved in the pulley and counterweight height adjustment mechanism. A counterweight is attached to a 37 cable with an 21 eyelet. This 37 cable ascends to a large 9 pulley, mounted to a solid metal 34 axle spanning the axis of the 1 central post in a central location for accurate tracking of the internal counterweight travel and the 2 support armature mount. The 34 axle is mounted to two solid metal, opposing 35 axle mounts, providing a strong connection to the 34 axle to the top of the 1 center post. After the cable travels over the 9 large pulley, it descends down to a another smaller 22 pulley, mounted inside across member of the 2 support armature, increasing the lifting capabilities of the 20 counterweight. In another embodiment of the invention, there may be three or more pulleys to increase the affects of the counterweight. After the cable wraps around the lower 22 pulley, it ascends to another 36 eyelet mounted to the center of the 1 center post, nearest the 9 large pulley. In another embodiment of the invention, an electrical motor mounted to the legs, turns a ball screw mounted inside the central post, and moves a mount attached to the 2 support armature to raise and lower the 2 support armature and coinciding 4 monitor along the ball screw mechanism. Electrical controls regulate the electrical motor, which turns the ball screw to raise and lower the supporting mount along the ball screw. In an alternative embodiment, there may be brakes that are applied directly to the pulley in addition to or instead of the brakes shown in the figures. In an alternative embodiment, the pulley may be replaced with a gear/pinion and rack or gear and chain system.

Figure 5:
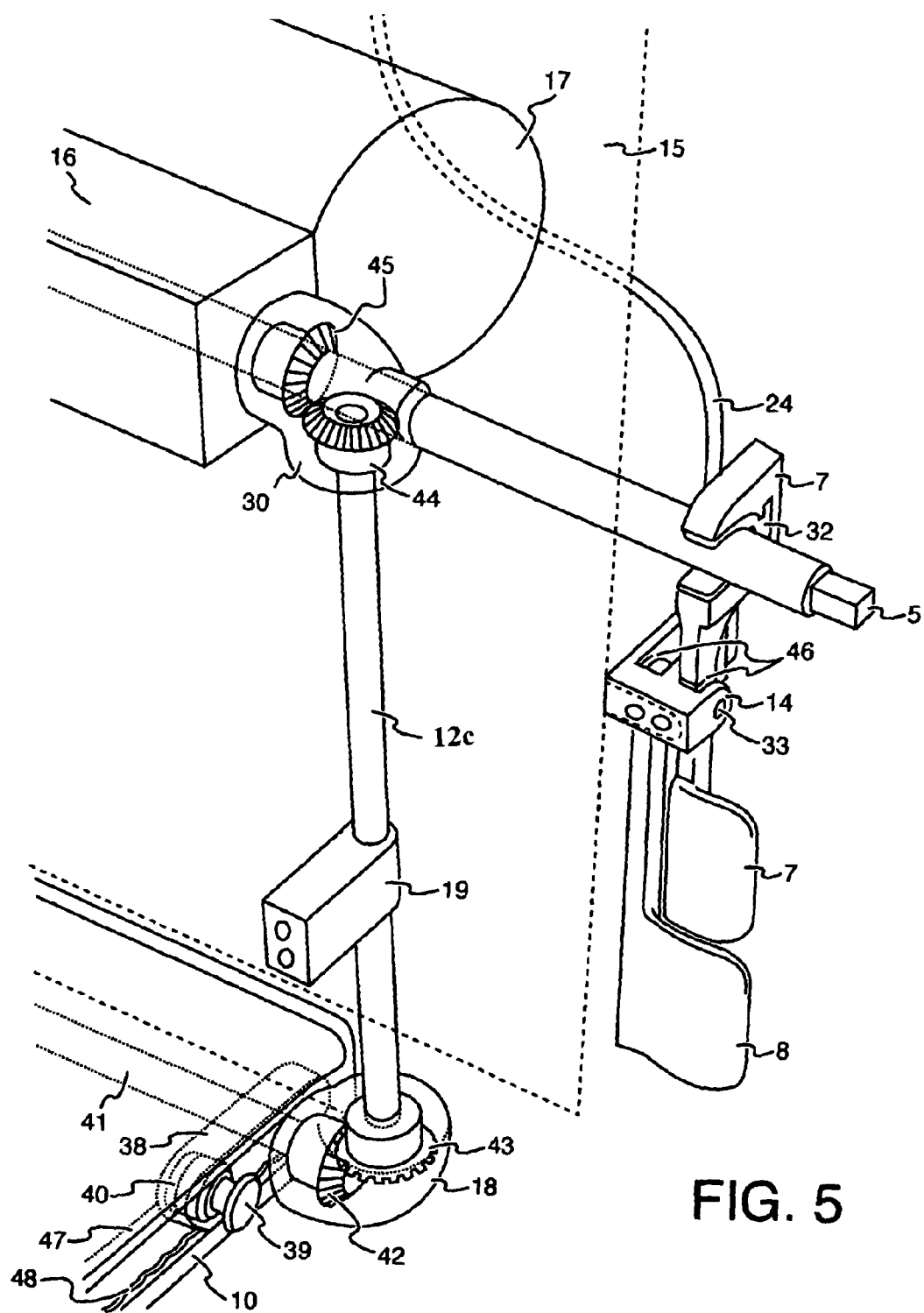
FIG. 5 is an angled view of the adjustment control levers and an embodiment of the keyboard tray.

FIG. 5 is an angled view showing one side of the adjustment controls for the keyboard tray mechanism. The keyboard tray pivots about on a joint that attaches the keyboard tray to the support for the monitor. This pivot allows for a self-adjusting 10 keyboard tray to stay level as the top changes tilt angle. This same mechanism is also mounted to the left side of the 15 monitor support plate to provide a dual system for safety and control purposes. Inside the 10 keyboard tray, is a small 38 plastic arm that a 40 spring filled 9 button sits inside and allows the 39 pushbutton, locking mechanism to regulate fore and aft adjustment to the 10 keyboard tray. This 38 arm is mounted to the 41 inside keyboard tray shaft and controls the rotation of the 10 keyboard tray. This 38 arm and gears are mounted to the 12c vertical and 41 horizontal shafts with cotter pins to prevent any spinning or movement along said shafts. This stability is crucial to providing support to all related mechanics. By pushing the side 39 buttons, indents on the inside of the button mechanism disengage from a molded, 48 rippled path inside the keyboard tray, and allow free horizontal travel of the tray, along an 47 inside channel running along both right and left sides of the inside of the 10 keyboard tray. This pair of 47 channels inside the tray, run the entire depth of the tray to allow for maximum range of motion for the 38 arm. This horizontal 41 keyboard shaft terminates into a 42 lower miter gear that engages with a 43 miter gear mounted to the 12c vertical keyboard shaft.

The vertical keyboard shafts 12a and 12c then travel through the 19 lightweight plastic support blocks, also mounted to the 15 support plate, and terminate with a 44 miter gear inside of the 30 upper gear housing. This gear engages with the 45 miter gear that is mounted to the 5 main support shaft, inside the 30 upper gear housing.

Figure 6:
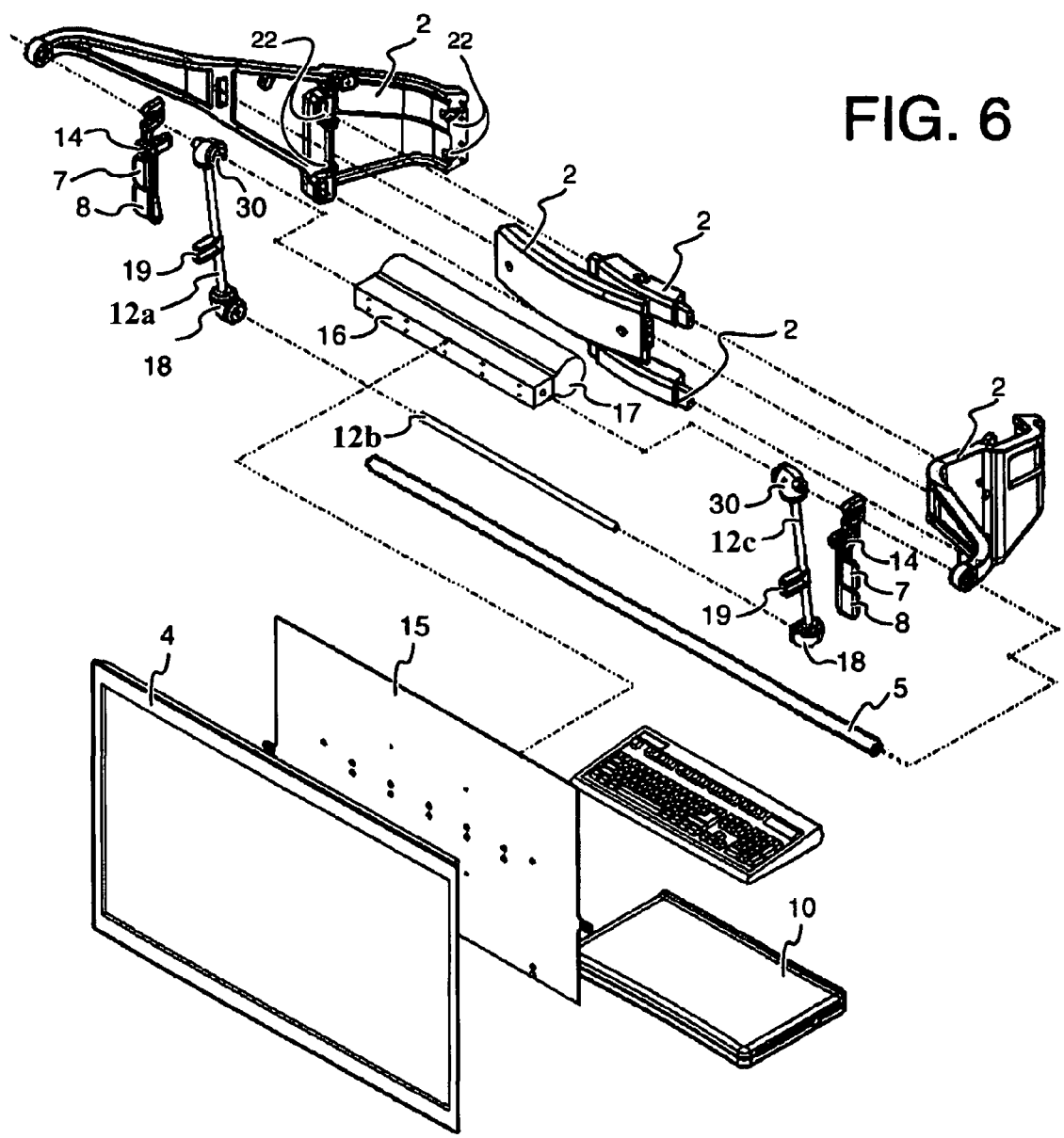
FIG. 6 is a front isometric exploded view of an embodiment of the monitor support armature, control levers and keyboard tray portion of the desk.

FIG. 6 is a front isometric exploded view of an embodiment of the monitor 2 support armature, control levers and 10 keyboard tray portion of the desk. This illustration provides a concise view of how the 2 support armature may be manufactured. The 2 support armature may be manufactured using five separate pieces for ease in mold making and added strength. This illustration shows how the control levers and 12a, 12b and 12c keyboard support shafts are duplicated for each side of the work desk. The mechanisms, previously outlined, must be duplicated for each side of the 4 monitor, to gain the safety and comfort benefits of the invention. This illustration also shows how the 5 main support shaft goes through the 16 support block which provides a mounting base for the 15 monitor support plate and the 17 monitor counterweight.

This illustration provides insight into how the 4 monitor would bolt onto the monitor 15 support plate. Made from steel or aluminum, this sheet is drilled for monitor attachment, provides support for the adjustment mechanism support block and 12a and 12b vertical keyboard connection shafts and 19 supporting blocks. This sheet can be economically manufactured in a variety of sizes shapes and drill patterns to easily accommodate a range of different monitor solutions. This elegant combination of 15 support plate, 19 keyboard tray mount, and 14 adjustment lever support block, provides the basis for the main novelties of this invention.

This illustration also highlights the location of the 22 sealed bearing rollers that will ride along the rails of the 1 center stack. The 22 front wheels will mount using bolts attached to the 2 support armature. The 22 rear wheels will attach to adjustment blocks first, then to the back of the 2 support armature.

In another embodiment of the invention, the 5 support shaft may be split into two shafts and mount to each side of the 15 monitor support plane. These shafts may be mounted to each side of a 15 monitor support plane in a fashion that would allow for incremental adjustment to the lateral center of gravity of the 4 monitor, upon the support shafts. This improvement would remove the need for a monitor counterweight, as the monitor would now be balanced between the two shafts. This improvement would reduce the overall weight of the 2 support armature and the need for a motorized height adjustment mechanism. As lighter monitors become available, will only benefit the functional qualities of this support system. A similar braking system for the tilt angle, is utilized for this embodiment, locking the tilt angle to the stabilized 12a, 12b and 12c main support shafts.

In other embodiments of the invention, there may be a computer built into the monitor or the monitor may be attached to; a computer that is located on the floor or; a laptop computer, held in place with custom support brackets.

Figure 7:
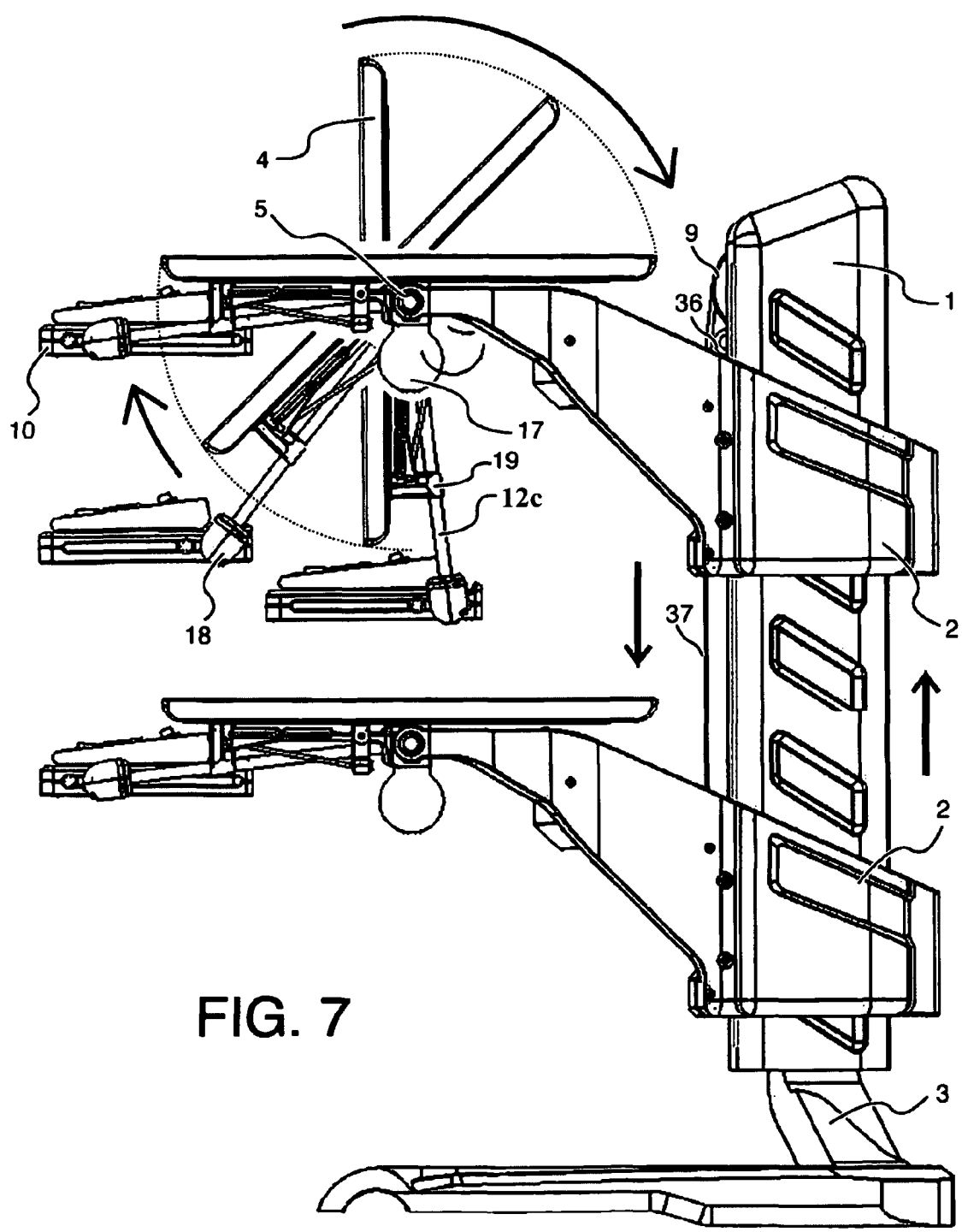
FIG. 7 is a side view of embodiment of the desk showing the range of tilting action and height adjustment options.
Figure 8:
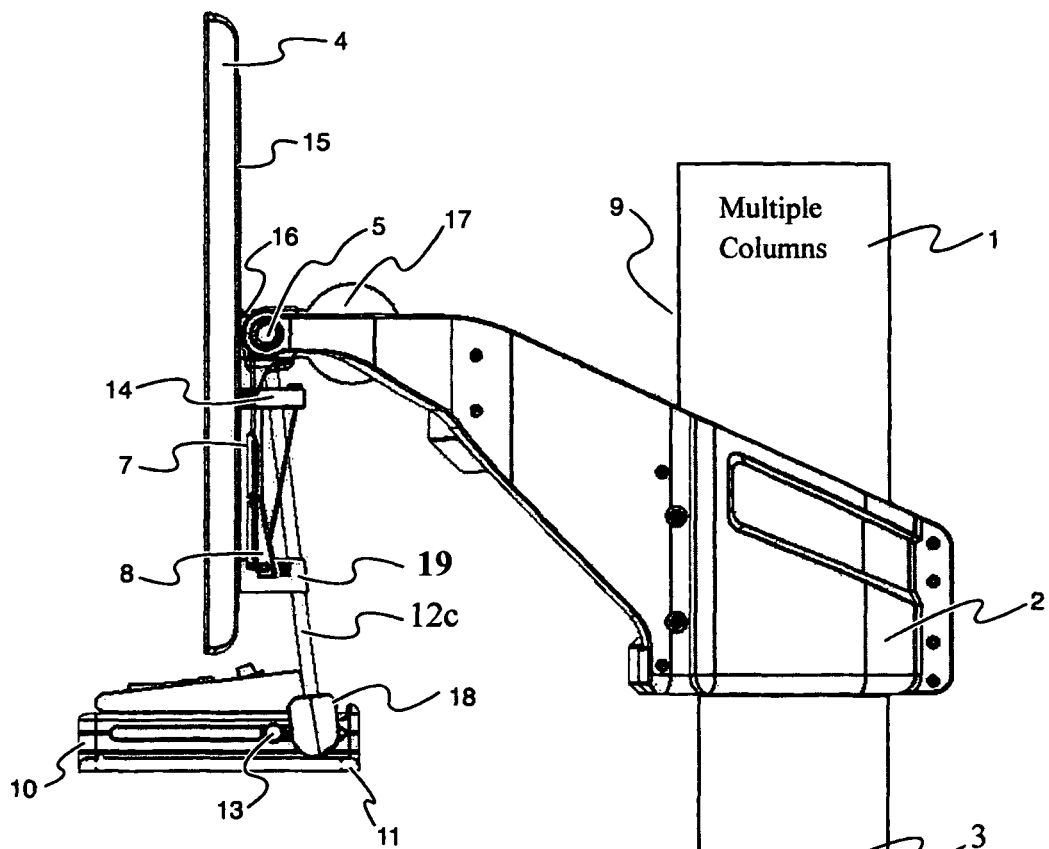
FIG. 8 is a front angled view of an embodiment of the desk with vertical top, showing multiple columns in block format.
Figure 9:
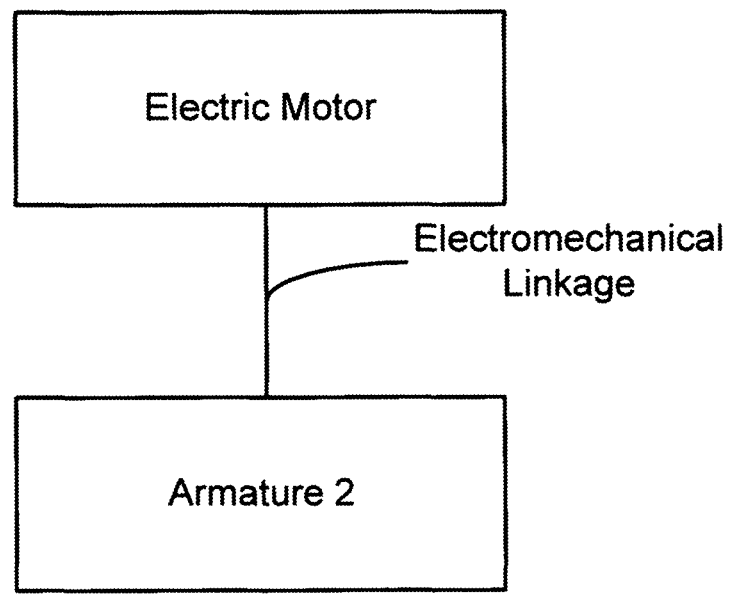
FIG. 9 is a block diagram of the relationship between the electric motor and armature of FIG. 1.

FIG. 7 is a side view of embodiment of the desk showing the range of tilting action and height adjustment options. This illustrates the full range of motion for the work desk. Assuming a touch 4 monitor is mounted to the top, the flexibility in range of motion will provide the optimum position for any user. This angle range is represented here as 90 degrees but there may be other embodiments of the invention that will allow for a larger range of up to 180 degrees of motion. The 2 support armature will ride along rails provided by the 1 center stack. 7 Manual brakes will engage to lock the height adjustment into place.

The monitor support plate will ride a 5 shaft with needle bearings mounted inside the 16 main support block and span the entire width of the desk area. Another set of manual 7 brakes will engage with the 5 main support shaft using 32 rubber brakes or set pins to lock the desired tilt angle into place. This will allow the 15 monitor support plane and all controls to ride along at any tilt angle Each embodiment disclosed herein may be used or otherwise combined with any of the other embodiments disclosed. Any element of any embodiment may be used in any embodiment. Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A workstation comprising:
a base;
a vertical column or multiple columns, affixed to said base;
an adjustable armature that rolls on and extends perpendicularly to the vertical column or the multiple columns;
a monitor mount affixed to said armature, incorporating 90° of tilt adjustment for the monitor mount;
a large keyboard tray affixed to said monitor mount using gears to remain at a constant angle when said monitor mount is tilted;
one or more brake levers and brake pads mounted to the armature; the brake levers and the brake pads are coupled, such that moving the brake levers causes the brake pads to engage a central post;
one or more calipers coupled to the brake pads;
the one or more calipers being mounted on the vertical column or the multiple columns;
a set of levers mounted on the armature closer to the monitor mount than to the vertical column or the multiple columns;
a spring coupled to the one or more calipers and the armature, pushing the calipers into the vertical column or the multiple columns, holding the armature in a fixed location on the vertical column or the multiple columns;
a cable attached at one point to the calipers and at another point to the set of levers, such that moving the set of levers pulls on the cable, which in turn pulls on the calipers, moving the calipers away from the vertical column or the multiple columns, allowing the armature to travel up and down along the vertical column or the multiple columns.

2. The workstation of claim 1, wherein the armature rolls on the vertical column or the multiple columns, aided by wheels, rails, at least one electric motor and at least one counterweight; the one or more brake levers and brake pads engage with the vertical column or the multiple columns to reinforce the adjustable armature against vertical or horizontal movement.

3. The workstation of claim 1, further comprising a CPU mounting assembly affixed to said armature or said columns.

4. The workstation of claim 1, wherein a computer monitor sits on the monitor mount.

5. A workstation comprising:
a base;
at least one vertical column rigidly affixed to the base;
an arm-structure including at least one arm that engages the at least one vertical column riding in a vertical direction along the at least one vertical column, and the arm of arm-structure extends perpendicularly away from the at least one vertical column;
a monitor mount rotatably affixed to the arm-structure, incorporating 90 degrees of tilt-adjustment for the monitor mount;
a keyboard tray rotatably coupled to the monitor mount towards a bottom end of the monitor mount, incorporating 90 degrees of tilt-adjustment with respect to the monitor mount, so that the keyboard tray adjusts with movement of the monitor mount to be placed in a horizontal position no matter what angle of tilt within the 90 degrees of tilt of the monitor mount, the monitor mount is adjusted to; as the monitor mount rotates, the keyboard tray moves horizontally;
a pulley system having at least one pulley wheel, the pulley system being coupled to the arm-structure;
a cord wrapped around the at least one pulley wheel of the pulley system, one end of the cord being attached to the at least one vertical column, another end of the cord attaches to a counterweight that creates a force that is translated through the cord and pulls the monitor mount in an upward direction, the counterweight making it easier to move the arm-structure upward than were the counterweight not present.

6. The workstation of claim 5, the counterweight being located within the at least one vertical column.

7. The workstation of claim 6, the counterweight engaging tracks within the at least one vertical column, the counterweight riding vertically as the arm-structure moves along the vertical column.

8. A workstation comprising:
a base;
at least one vertical column rigidly affixed to the base;
an arm-structure including at least one arm that engages the at least one vertical column riding in a vertical direction along the at least one vertical column, and the arm of the arm-structure extends perpendicularly away from the at least one vertical column;
a monitor mount rotatably affixed to the arm-structure, incorporating 90 degrees of tilt-adjustment for the monitor mount;
a keyboard tray rotatably coupled to the monitor mount towards a bottom end of the monitor mount, incorporating 90 degrees of tilt-adjustment with respect to the monitor mount, so that the keyboard tray adjusts with movement of the monitor mount to be placed in a horizontal position no matter what angle of tilt within the 90 degrees of tilt of the monitor mount, the monitor mount is adjusted to; as the monitor mount rotates, the keyboard tray moves horizontally;
a pulley system including at least two pulley wheels, one pulley wheel being mounted at a top end of the at least one vertical column and one pulley wheel being mounted on the arm-structure, the cord being wrapped over the at least two pulley wheels and a first end of a cord being coupled to the at least one vertical column and a second end of the cord being coupled to a counterweight.

9. A workstation comprising:
a base;
at least one vertical column rigidly affixed to the base;
an arm-structure including at least one arm that engages the at least one vertical column, the arm-structure riding in a vertical direction along the at least one vertical column, and the arm of arm-structure extends perpendicularly away from the at least one vertical column;
a monitor mount rotatably affixed to the arm-structure, incorporating 90 degrees of tilt-adjustment for the monitor mount;
a keyboard tray rotatably coupled to the monitor mount towards a bottom end of the monitor mount, incorporating 90 degrees of tilt-adjustment with respect to the monitor mount, so that the keyboard tray adjusts with movement of the monitor mount to be placed in a horizontal position no matter what angle of tilt within the 90 degrees of tilt of the monitor mount, the monitor mount is adjusted to; as the monitor mount rotates, the keyboard tray moves horizontally;
a horizontal support shaft rotatably mounted in a horizontal position to the arm-structure;
a support block rotatably mounted to the horizontal support shaft allowing the support block to rotate on the horizontal support shaft;
a support plate rigidly coupled to the support block, so that the support block supports the support plate;
a bracket coupled to the support plate;
at least one vertical lever rotatably coupled to the bracket at one point and gripping the horizontal support shaft at another point;
a spring pushing the point at which the lever that grips the horizontal support shaft into the horizontal support shaft, therein causing the lever to grip, and hold, the horizontal support shaft from rotating, such that rotating the lever to move the point at which the lever that grips the horizontal support shaft away from the horizontal support shaft allows the horizontal support shaft to rotate, allowing the angle of tilt of the monitor mount with respect to the arm-structure to be changed.

10. The workstation of claim 9, further comprising:
a needle bearing engaging the horizontal support shaft;
the support block being mounted, via the needle bearing, to the horizontal support shaft allowing the support block to rotate on the horizontal support shaft.

11. The workstation of claim 9, further comprising:
a horizontal keyboard shaft rigidly coupled to the keyboard tray and a vertical shaft allowing the keyboard tray to be adjusted to a horizontal position with adjustments to a monitor mount's position is adjusted, no matter what angle of tilt within the 90 degrees of tilt of a monitor mount the monitor mount is oriented.

12. The workstation of claim 11, further comprising:
the horizontal support shaft having a gear on at least one end the horizontal keyboard shaft having a gear on at least one end;
the vertical shaft having a gear at one end engaging the gear of the horizontal support shaft and the vertical shaft having a gear at another end engaging a gear of the horizontal keyboard shaft, the keyboard tray being rigidly held to the horizontal keyboard shaft, so as to control rotation of the keyboard tray and rotate an angle of the keyboard tray with respect to the
support plate as the angle of the support plate is adjusted, keeping the keyboard tray horizontal no matter the angle of the support plate.

13. A workstation comprising:
a base;
at least one vertical column rigidly affixed to the base;
an arm-structure including at least one arm that engages the at least one vertical column riding in a vertical direction along the at least one vertical column, and the arm of arm-structure extends perpendicularly away from the at least one vertical column;
a monitor mount rotatably affixed to the arm-structure, incorporating 90 degrees of tilt-adjustment for the monitor mount;
a keyboard tray rotatably coupled to the monitor mount towards a bottom end of the monitor mount, incorporating 90 degrees of tilt-adjustment with respect to the monitor mount, so that the keyboard tray adjusts with movement of the monitor mount to be placed in a horizontal position no matter what angle of tilt within the 90 degrees of tilt of the monitor mount, the monitor mount is adjusted to; as the monitor mount rotates, the keyboard tray moves horizontally;
an arm within the keyboard tray rigidly held to the horizontal keyboard shaft;
a button inside the arm;
a molded path inside a horizontal channel in the keyboard tray; and
a spring inside the button pushing the button to engage the molded path; pushing the button against the spring disengages the button from the molded path, allowing free horizontal travel of the keyboard tray, along the horizontal channel.

14. A workstation comprising:
a base;

at least one vertical column rigidly affixed to the base;
an arm-structure including at least one arm that engages the at least one vertical column riding in a vertical direction along the at least one vertical column, and the arm of arm-structure extends perpendicularly away from the at least one vertical column;
a monitor mount rotatably affixed to the arm-structure, incorporating 90 degrees of tilt-adjustment for the monitor mount;
a keyboard tray rotatably coupled to the monitor mount towards a bottom end of the monitor mount, incorporating 90 degrees of tilt-adjustment with respect to the monitor mount, so that the keyboard tray adjusts with movement of the monitor mount to be placed in a horizontal position no matter what angle of tilt within the 90 degrees of tilt of the monitor mount, the monitor mount is adjusted to; as the monitor mount rotates, the keyboard tray moves horizontally;
a pulley system having two pulley wheels;
a cord wrapped around the two pulley wheels of the pulley system, one end of the cord being attached to the monitor mount having a first counterweight that pushes the monitor mount downwards, another end of the cord being attached to a second counterweight that creates a force that translates through the cord and pulls the monitor mount in an upward direction, the first counterweight and second counterweight making it easier to move the arm-structure upward than were the first counterweight and the second counterweight not present;
wheels, attached to the second counterweight, engaging tracks within the at least one vertical column, the second counterweight riding vertically, via the wheels, as the arm-structure moves;
one or more feet attached to the base, the workstation having a center of gravity, the one or more feet extend past the center of gravity of the workstation no matter what combination of possible positions during normal use the arm-structure, monitor mount, and keyboard tray are in, to keep the workstation from falling towards the arm-structure;
a mouse-tray-support-block mounted rigidly to the keyboard tray;
a mouse tray rigidly mounted to the mouse-tray-support-block;
a horizontal support shaft rotatably mounted in a horizontal position to the arm-structure; the arm-structure having two arms extending away from the at least one vertical column, the horizontal support shaft being rotatably held in two sockets, which include a first socket at an end of a first of the two arms and a second socket at an end of a second of the two arms;
a needle bearing engaging the horizontal support shaft;
a support block being mounted, via the needle bearing, to the horizontal support shaft allowing the support block to rotate on the horizontal support shaft;
a support plate rigidly coupled to the support block, so that the support block supports the support plate;
two brackets opposite one another, each coupled to an opposite side of the support plate to another of the two brackets;
a first vertical lever rotatably coupled to a first of the two brackets at one point on the first vertical lever and gripping the horizontal support shaft at another point of the first vertical lever;
a second vertical lever rotatably coupled to a second of the two brackets at one point of the second vertical lever and gripping the horizontal support shaft at another point of the second horizontal lever;
a first spring pushing the point at which the first lever grips the horizontal support shaft, into the horizontal support shaft, therein causing the first lever to grip, and hold, the horizontal support shaft from rotating;
a second spring pushing the point at which the second lever that grips the horizontal support shaft, into the horizontal support shaft, therein causing the second lever to grip, and hold, the horizontal support shaft from rotating; such that rotating the first lever to move the point at which the first lever grips the horizontal support shaft away from the horizontal support shaft and rotating the second lever to move the point at which the second lever that grips the horizontal support shaft away from the horizontal support shaft, allows the horizontal support shaft to rotate, allowing an angle of tilt of the monitor mount with respect to the arm-structure to be changed;
a third vertical lever rotatably coupled to the first of the two brackets at one point on the third vertical lever;
a fourth vertical lever rotatably coupled to the second of the two brackets at one point on the fourth vertical lever;
a first caliper mounted on one side of the arm-structure engaging the at least one vertical column;
a second caliper mounted on another side of the arm-structure engaging the at least one vertical column;
a third spring pushing the first caliper closed to grip, and hold, the at least one vertical column;
a fourth spring pushing the second caliper closed to grip, and hold, the at least one vertical column;
the third vertical lever and the fourth vertical lever being coupled to the third spring and the fourth spring by brake cable, the brake cable pushing or pulling a point on the third spring and pushing or pulling a point on the fourth spring to pull the first calipers and the second calipers open working against the third spring and the fourth spring to allow the arm-structure to move vertically along the vertical support; and
a horizontal keyboard shaft rigidly coupled to the keyboard tray and the vertical shaft and rotatably mounted with respect to the monitor mount, allowing the keyboard tray to be adjusted to a horizontal position with adjustments a monitor mount's position no matter what angle of tilt within the 90 degrees of tilt of the monitor mount the monitor mount is oriented;
the horizontal support shaft having a first miter gear on a first end and second miter gear on a second end;
the horizontal keyboard shaft having a third miter gear on a first end of the horizontal keyboard shaft and a fourth miter gear on a second end of the horizontal keyboard shaft; the first vertical shaft having a fifth miter gear at one end engaging the gear of the first miter gear of the horizontal support shaft and the first vertical shaft having a sixth miter gear at another end engaging the third miter gear of the horizontal keyboard shaft;
the second vertical shaft having a seventh miter gear at one end engaging the gear of the second miter gear of the horizontal support shaft and the second vertical shaft having an eighth miter gear at another end engaging the fourth miter gear of the horizontal keyboard shaft;
the keyboard tray being rigidly held to the keyboard shaft, so as to control rotation of the keyboard tray and rotate an angle of the keyboard tray with respect to the monitor support plate as an angle of tilt of the monitor support plate is adjusted, keeping the keyboard tray horizontal no matter an angle of tilt of the monitor support;
a first arm within the keyboard tray rigidly held to the horizontal keyboard shaft at the first end of the keyboard shaft;
a second arm within the keyboard tray rigidly held to the horizontal keyboard shaft at the second end of the keyboard shaft;
a first button inside the first arm;
a second button inside the second arm;
a first molded path inside a first horizontal channel in the keyboard tray at a first end of the keyboard tray;
a second molded path inside a second horizontal channel in the keyboard tray at a second end of the keyboard tray;
a first spring inside the first button, pushing the first button to engage the first molded path; and
a second spring inside the second button pushing the second button to engage the second molded path;
pushing the first button against the first spring disengages the first button from the first molded path and pushing the second button against the second spring disengages the second button from the second molded path, allowing free horizontal travel of the keyboard tray, along the channels.

* * * * *